(12) United States Patent
Stayton et al.

(10) Patent No.: US 11,194,041 B2
(45) Date of Patent: Dec. 7, 2021

(54) SYSTEMS AND METHODS FOR PROVIDING L-BAND RF ARCHITECTURES

(71) Applicant: Aviation Communication & Surveillance Systems, LLC, Phoenix, AZ (US)

(72) Inventors: Gregory Theodore Stayton, Peoria, AZ (US); Robert John McCullen, Queen Creek, AZ (US)

(73) Assignee: AVIATION COMMUNIATION & SURVEILLANCE SYSTEMS, LLC, Phoenix, AZ (US)

(*) Notice: Subject to any disclaimer, the term of this patent is extended or adjusted under 35 U.S.C. 154(b) by 255 days.

(21) Appl. No.: 16/162,237

(22) Filed: Oct. 16, 2018

(65) Prior Publication Data

US 2019/0113616 A1 Apr. 18, 2019

Related U.S. Application Data

(60) Provisional application No. 62/573,096, filed on Oct. 16, 2017.

(51) Int. Cl.
*G01S 13/933* (2020.01)
*H04B 7/185* (2006.01)
(Continued)

(52) U.S. Cl.
CPC .......... *G01S 13/933* (2020.01); *G01S 13/767* (2013.01); *G01S 13/781* (2013.01); *G01S 13/785* (2013.01);
(Continued)

(58) Field of Classification Search
CPC .... G01S 13/933; G01S 13/767; G01S 13/781; G01S 13/785; G08G 5/0008;
(Continued)

(56) References Cited

U.S. PATENT DOCUMENTS 5,321,406 A * 6/1994 Bishop .................. G01S 13/933
342/32
6,222,480 B1 * 4/2001 Kuntman .............. G01S 13/933
342/30
(Continued)

FOREIGN PATENT DOCUMENTS

EP 1826913 8/2007
EP 1826913 A2 * 8/2007 .......... H04B 1/0007
(Continued)

OTHER PUBLICATIONS

Notification of Transmittal of the International Search Report and the Written Opinion of the International Searching Authority, or Declaration, dated Jan. 23, 2019, by the European Patent Office / International Search Authority, for related international patent application PCT/US2018/056148.

*Primary Examiner* — Vladimir Magloire
*Assistant Examiner* — Nuzhat Pervin
(74) *Attorney, Agent, or Firm* — Dickinson Wright PLLC

(57) ABSTRACT

Various communication systems may benefit from suitable architectures. For example, L-band radio frequency (RF) architectures may be beneficial to systems including avionics systems. A system can include a mode-s function as well as a traffic alert and collision avoidance system function separate from the mode-s function. The system can further include a directional antenna in reception and transmission connection with the traffic alert and collision avoidance system function. The system can additionally include an omni-directional antenna in reception and transmission connection with the mode-s function.

7 Claims, 2 Drawing Sheets

(51) Int. Cl.
  *G01S 13/78* (2006.01)
  *G01S 13/76* (2006.01)
  *H01Q 21/28* (2006.01)
  *G08G 5/00* (2006.01)
  *G08G 5/04* (2006.01)

(52) U.S. Cl.
  CPC ......... *G08G 5/0008* (2013.01); *G08G 5/0013* (2013.01); *G08G 5/0021* (2013.01); *G08G 5/0078* (2013.01); *G08G 5/045* (2013.01); *H04B 7/18506* (2013.01); *H01Q 21/28* (2013.01)

(58) Field of Classification Search
  CPC .. G08G 5/0013; G08G 5/0021; G08G 5/0078; G08G 5/045; H04B 7/18506; H01Q 21/28
  USPC .......................................................... 342/29
  See application file for complete search history.

(56) References Cited

U.S. PATENT DOCUMENTS

| | | | | | |
|---|---|---|---|---|---|
| 6,313,783 | B1* | 11/2001 | Kuntman | ............ | G01S 13/933 342/32 |
| 7,990,283 | B2* | 8/2011 | Breed | ............ | G01C 21/30 340/903 |
| 8,217,850 | B1* | 7/2012 | Jennings | ............ | H01Q 9/36 343/810 |
| 8,976,057 | B1* | 3/2015 | Jacobson | ............ | G01S 3/14 342/29 |
| 9,116,236 | B1* | 8/2015 | Billsberry | ............ | G08G 5/045 |
| 9,405,005 | B1* | 8/2016 | Arteaga | ............ | G01S 13/933 |
| 2002/0011950 | A1* | 1/2002 | Frazier | ............ | G01C 23/00 342/357.32 |
| 2002/0154061 | A1* | 10/2002 | Frazier, Jr. | ............ | G01S 13/933 342/455 |
| 2003/0016158 | A1* | 1/2003 | Stayton | ............ | G08G 5/0008 342/29 |
| 2004/0196813 | A1* | 10/2004 | Ofek | ............ | H01Q 21/065 370/334 |
| 2004/0196834 | A1* | 10/2004 | Ofek | ............ | H01Q 21/065 370/352 |
| 2005/0156777 | A1* | 7/2005 | King | ............ | G08G 5/0021 342/29 |
| 2007/0200741 | A1* | 8/2007 | Hunter | ............ | H04B 1/0007 341/126 |
| 2008/0174472 | A1* | 7/2008 | Stone | ............ | G08G 5/0021 342/30 |
| 2009/0201191 | A1* | 8/2009 | Kozhevnikov | ............ | G01S 13/878 342/32 |
| 2010/0292871 | A1* | 11/2010 | Schultz | ............ | G01S 13/865 701/3 |
| 2011/0222448 | A1* | 9/2011 | Ofek | ............ | H04B 7/0491 370/310 |
| 2013/0121219 | A1* | 5/2013 | Stayton | ............ | H04B 7/26 370/310 |
| 2015/0102953 | A1* | 4/2015 | Stayton | ............ | H04B 1/3822 342/47 |
| 2015/0248838 | A1* | 9/2015 | Stone | ............ | G08G 5/04 342/30 |
| 2015/0331099 | A1* | 11/2015 | Wu | ............ | G08G 5/0008 342/32 |
| 2017/0271755 | A1* | 9/2017 | Troxel | ............ | H01Q 1/286 |
| 2017/0358227 | A1* | 12/2017 | Troxel | ............ | G01S 13/782 |

FOREIGN PATENT DOCUMENTS

| | | | | |
|---|---|---|---|---|
| WO | WO-2006124063 A2 | * | 11/2006 | ........ H01Q 21/205 |
| WO | WO-2008054507 A2 | * | 5/2008 | ........ G08G 5/0021 |

* cited by examiner

SYSTEMS AND METHODS FOR PROVIDING L-BAND RF ARCHITECTURES

CROSS-REFERENCE TO RELATED APPLICATION

This application is a non-provisional, and claims the benefit and priority of, U.S. Provisional Patent Application No. 62/573,096, filed Oct. 16, 2017, the entirety of which is hereby incorporated herein by reference.

BACKGROUND

Field

Various communication systems may benefit from suitable architectures. For example, L-band radio frequency (RF) architectures may be beneficial to systems including avionics systems.

Related Art

Use of a traffic alert and collision avoidance system (TCAS) directional antenna for a Mode-S function currently requires four Mode-S transmitters and four Mode-S receivers. FIG. 1 illustrates a current system for use of a TCAS directional antenna for the Mode-S function. The four Mode-S transmitters must maintain the same RF phase for the Mode-S Omni directional antenna pattern. This configuration needs initial and constant phase adjustment.

Again with reference to FIG. 1, the switching network using the TCAS directional antenna is more complex to switch out the four TCAS receivers and transmitters. Additionally, switching more pin diodes uses more power, thereby increasing heat production. As a result, TCAS system reliability typically declines due to complexity and unnecessary heating.

In the L-band RF architecture illustrated in FIG. 1, use of the TCAS directional antenna for the mode S function requires four mode S transmitters and four mode S receivers. The four mode S transmitters must maintain the same RF phase for the mode S omni antenna pattern. This may lead to needing both initial and on-going phase adjustments. Furthermore, the switching network using the TCAS directional antenna may be complex in order to switch out the four TCAS receivers and TCAS transmitters. Switching more pin diodes may use more power and may increase heating. The additional complexity and heating may decrease TCAS system reliability.

SUMMARY

According to certain embodiments of the present invention, a system can include a mode-s function. The system can also include a traffic alert and collision avoidance system function separate from the mode-s function. The system can further include a directional antenna in reception and transmission connection with the traffic alert and collision avoidance system function. The system can additionally include an omni-directional antenna in reception and transmission connection with the mode-s function.

BRIEF DESCRIPTION OF THE DRAWINGS

The accompanying drawings are provided for purposes of illustration and not by way of limitation.

DETAILED DESCRIPTION

Figure 1:
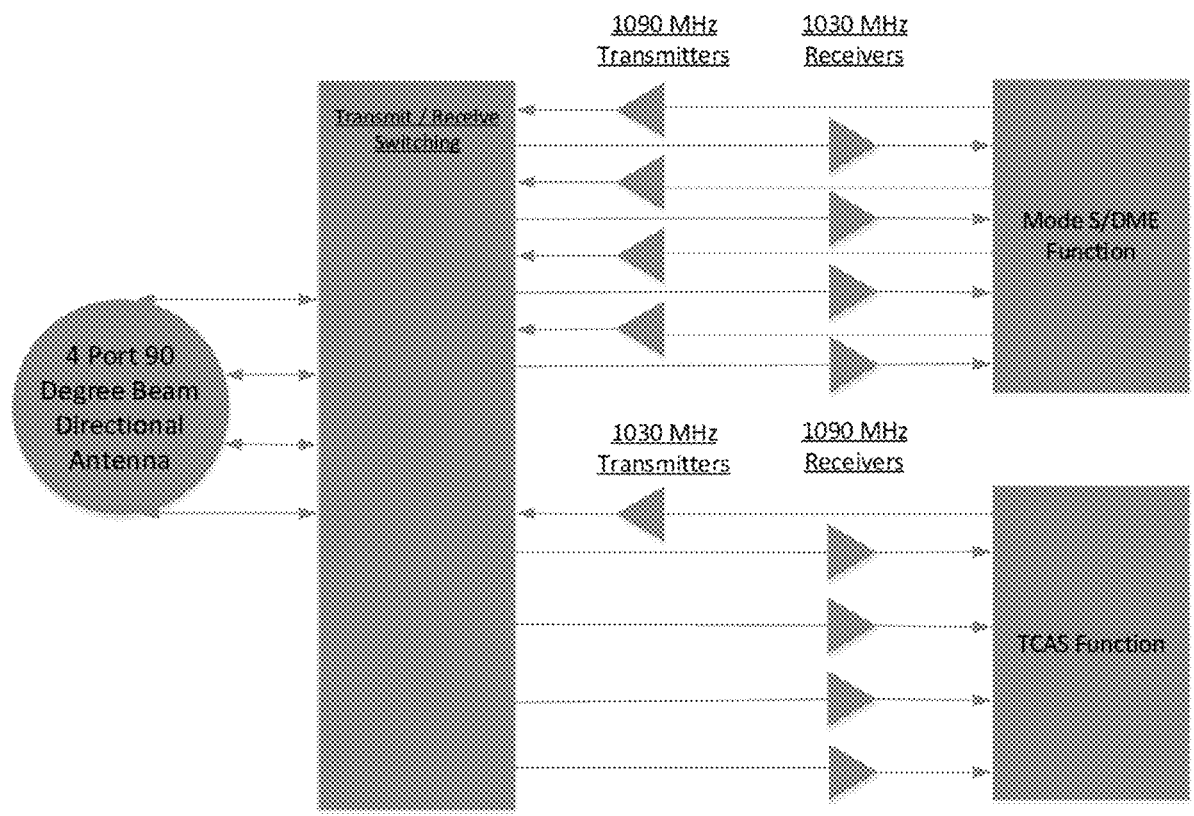
FIG. 1 illustrates a current system for use of a TCAS directional antenna for the Mode-S function.
Figure 2:
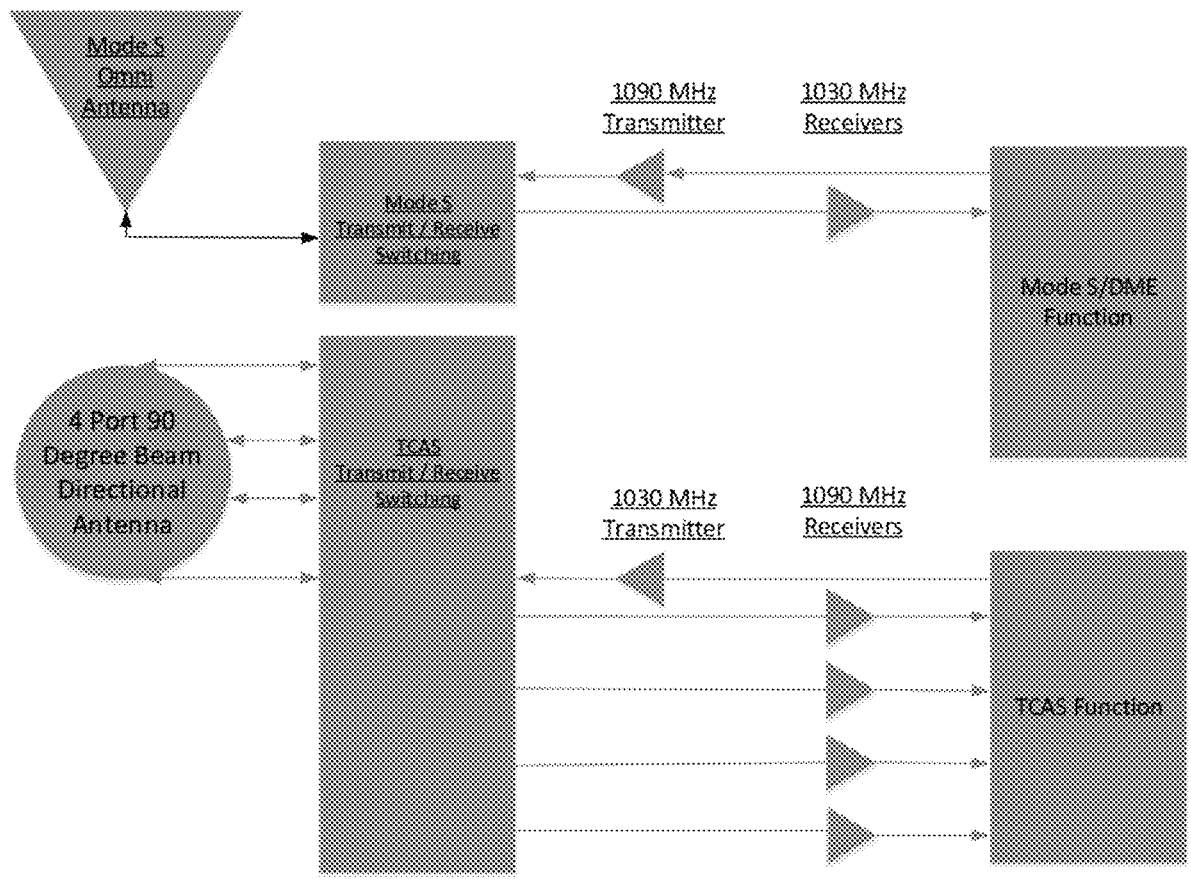
FIG. 2 illustrates an improved and simplified L-band RF architecture, according to certain embodiments.

Certain embodiments of the present invention, as exemplified by reference to FIG. 2, provide for an improved and simplified L-Band RF architecture. Thus, FIG. 2 illustrates an improved and simplified L-band RF architecture, according to certain embodiments.

This architecture may use an omnidirectional top L-Band antenna. This may enable use of one Mode-S transmitter and one Mode-S receiver. This configuration may also have the benefit of eliminating the need for phase adjustment.

The switching network using the omnidirectional L-Band antenna can be simplified since only one Mode-S transmitter and receiver may be used. Moreover, switching fewer pin diodes may result in using less power and decreasing heat generation. As a result, TCAS system reliability may increase due to reduced overall complexity and heat generation. One transmitter can be used for the L-Band frequencies of TCAS, Mode-S and DME.

Various embodiments of the present invention can be implemented in a variety of ways. For example, a system can include a mode-s function. In this context, a "function" can include computer hardware and communication hardware. The computer hardware may be any suitable processors, such as multiple core processors, a field programmable gate array (FPGA), or an application specific integrated circuit (ASIC). The communication hardware can include interface cards, power amplifiers, cabling, receivers, transmitters, and transceivers. The function can also include computer memory including a non-transitory computer-readable medium. The system can store a program of instructions on such memory, and can execute the program for example to accomplish the switching procedures mentioned above.

The system can also include a traffic alert and collision avoidance system function separate from the mode-s function. In terms of being separate, the traffic alert and collision avoidance system function can be on a separate line replaceable unit (LRU), on a separate card, or on the same card, but with dedicated hardware. The traffic alert and collision avoidance system function can be any collision avoidance or alerting system function, such as a TCAS-I, a TCAS-II, a traffic advisory system (TAS), or an automated dependent surveillance B (ADS-B) advisory system. Any other similar or equivalent systems can also be included within the general category of collision avoidance or alerting systems.

The system can further include a directional antenna in reception and transmission connection with the traffic alert and collision avoidance system function. The system can additionally include an omni-directional antenna in reception and transmission connection with the mode-s function.

The mode-s function can also include a distance measuring equipment (DME) function.

In certain embodiments, only a single transmitter and a single receiver are provided between the mode-s function and the omni-directional antenna. The single transmitter can be a 1090 MHz transmitter, with normal design tolerances regarding the frequency of transmission. The single receiver can be a 1030 Mhz receiver, with normal design tolerances regarding the frequency of reception.

The omni-directional antenna can be a mode-s omni-directional antenna. This may be an omni-directional antenna suitable for the transmission and reception of mode-s signals.

The directional antenna can be a four port directional antenna. More specifically, in certain embodiments, the four port directional antenna can be a four port 90 degree beam directional antenna.

The simplified L-band RF architecture according to certain embodiments of the present invention may make use of an omni top L-band antenna, as mentioned above. This may only involve a single Mode S transmitter and a single Mode S receiver, which may provide a variety of benefits. No phase adjustments may be necessary because of the use of an omnidirectional antenna. Furthermore, the switching network using the omni-directional L-band antenna may be simplified, because only one Mode S transmitter and receiver are used. Switching fewer pin diodes can result in using less power, which may decrease heating. As a result of the lower complexity and decreased heating TCAS system reliability may be improved. One transmitter can be used for the L-band RF frequencies of TCAS, Mode S, and DME.

What is claimed is:

1. A system, comprising:
    a transponder configured to provide mode-s and distance measuring equipment (DME) functionality;
    a traffic alert and collision avoidance system separate from the transponder;
    a directional antenna in reception and transmission connection with the traffic alert and collision avoidance system; and
    an omni-directional antenna in reception and transmission connection with the transponder, wherein the DME functionality and mode-s functionality are coupled to the omni-directional antenna and not coupled to the directional antenna.
2. The system of claim 1, further comprising a single transmitter and a single receiver are connected between the transponder and the omni-directional antenna.
3. The system of claim 2, wherein the single transmitter comprises a 1090 MHz transmitter.
4. The system of claim 2, wherein the single receiver comprises a 1030 Mhz receiver.
5. The system of claim 1, wherein the omni-directional antenna is configured to provide a frequency range suitable for mode-s.
6. The system of claim 1, wherein the directional antenna comprises a four port directional antenna.
7. The system of claim 6, wherein the four port directional antenna having a beam for each 90 degree sector.

* * * * *